United States Patent [19]

Ingalls

[11] Patent Number: 5,316,332
[45] Date of Patent: May 31, 1994

[54] METHOD AND STRUCTURE FOR CORRECTING ALIGNMENT OF KINGPIN AXLE ASSEMBLIES

[75] Inventor: William E. Ingalls, Atascadero, Calif.

[73] Assignees: Thomas W. O'Rourke; John E. O'Rourke, both of Boulder, Colo.

[21] Appl. No.: 947,450

[22] Filed: Sep. 21, 1992

[51] Int. Cl.⁵ ............................................. B62D 17/00
[52] U.S. Cl. .................................................. 280/661
[58] Field of Search ........................ 280/661, 93, 96.1

[56] References Cited

U.S. PATENT DOCUMENTS

| | | | |
|---|---|---|---|
| 4,243,339 | 1/1981 | Dickerson | 280/661 |
| 4,795,187 | 1/1989 | Ingalls | 280/661 |
| 4,831,744 | 5/1989 | Specktor et al. | 280/661 |
| 4,836,574 | 6/1989 | Ingalls | 280/661 |

OTHER PUBLICATIONS

"Spherical" Date and Source unknown.

Primary Examiner—Margaret A. Focarino
Assistant Examiner—Paul Dickson
Attorney, Agent, or Firm—Harold A. Burdick

[57] ABSTRACT

A vehicle kingpin assembly having a kingbolt journalled in a knuckle with laterally offset projections on the ends of the kingbolt, endcaps journalled in a yoke with offset openings therein holding the projections in spherical bearings, and compliant thrust bearings between the knuckle and the yoke so that the angular relationship between the knuckle and the yoke may be varied to adjust camber and/or caster by rotating the kingbolt in the knuckle and/or the endcaps in the yoke.

9 Claims, 4 Drawing Sheets

METHOD AND STRUCTURE FOR CORRECTING ALIGNMENT OF KINGPIN AXLE ASSEMBLIES

FIELD OF THE INVENTION

The invention relates broadly to vehicles with at least one steerable wheel rotatably carried on a solid axle by means of a kingbolt extending from a steering knuckle to a yoke, and more particularly to an improved structure and method for correcting the wheel alignment of such vehicles.

BACKGROUND OF THE INVENTION

Vehicles used for heavy duty purposes commonly have at the steerable wheels a kingpin assembly mounted at the axle end and carrying the spindle assembly and wheel. A kingbolt, usually in the form of a shaft, simply extends through and is secured in a steering knuckle on one of the axle or spindle assembly and into a yoke on the other thereof. Thrust bearings in the form of washers or roller bearings are interposed between the knuckle and yoke. The sturdy kingpin assembly is commonly mounted at the ends of a solid axle which in turn is commonly "dropped" in the central portion and attached to the vehicle by shackles and leaf springs.

While the kingpin assembly is simple and rugged, the ability to correct camber and/or caster misalignments is limited. Camber is most commonly corrected by bending the axle appropriately with a hydraulic tool which mounts on the axle. Limited caster correction can be gained by shims placed between the axle and leaf springs. If both wheels require equal correction for caster, shims are effective. However, it is often attempted to correct each wheel independently of the other by installing different shims at the springs. This is an illusory solution in that the shim difference merely distorts the springs rather than twisting the robust axle.

In the unique instance of "split kingpin" axles, such as is used in closed knuckle, four wheel drive vehicles, a means is known to correctly align the wheels. U.S Pat. No. 4,795,187 describes a split (or stub) king pin member which is offset but parallel to the original axis of the split king pin. This allows camber correction but is not germane to the single kingpin assembly.

SUMMARY OF THE INVENTION

The present invention relates to an improved vehicle kingpin assembly and method in which the knuckle and yoke members can be selectively tilted one relative to the other to correct wheel camber and/or steering caster. This is effected by the unique interface between the kingbolt, which is rotatably mounted but lockable in the knuckle, and endcaps, which are mounted in the yoke. The interface between the kingbolt and endcaps are similar at each end of the kingbolt. A male bearing surface projects eccentrically from one of an end cap or the kingbolt and is received in an offset opening defined in the other with compliance means, such as a spherical bearing, interposed therebetween. The projections or openings are offset in opposite directions at the ends of the kingbolt. Thrust bearing between each end of the knuckle and the yoke are also compliance means, preferably spherical bearings.

Corrective movements can be either primary or secondary. As used herein, primary denotes a change in steering geometry, i.e., caster, steering inclination angle (and resultant camber change), etc., between the solid axle and spindle. To do this the pivot points on the axle must change. Secondary movement only changes the position of the spindle, i.e., camber, but not the steering geometry. When the knuckle is fixed to the axle, rotation of the kingbolt produces primary movement and concurrent camber change while rotation of the endcaps produces only secondary movement. Alternatively, when the yoke is attached to the axle, the endcaps produce such primary movement while the kingbolt produces secondary movement.

The endcaps or kingbolt of the instant invention can be employed individually but consideration of the primary and secondary corrective movements will confirm the advantages of cooperative use of both. By first establishing the appropriate caster using the appropriate primary adjustment component for a given configuration, the camber may remain outside of the desired setting. But by then repositioning the other component, secondary corrections can be made to the camber without changing the caster setting.

With these and other objects in view, which will become apparent to one skilled in the art as the description proceeds, this invention resides in the novel construction, combination, arrangement of parts and components, and in the method, substantially as hereinafter described, and more particularly defined by the appended claims, it being understood that changes in the precise embodiment of the herein disclosed invention are meant to be included as come within the full scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
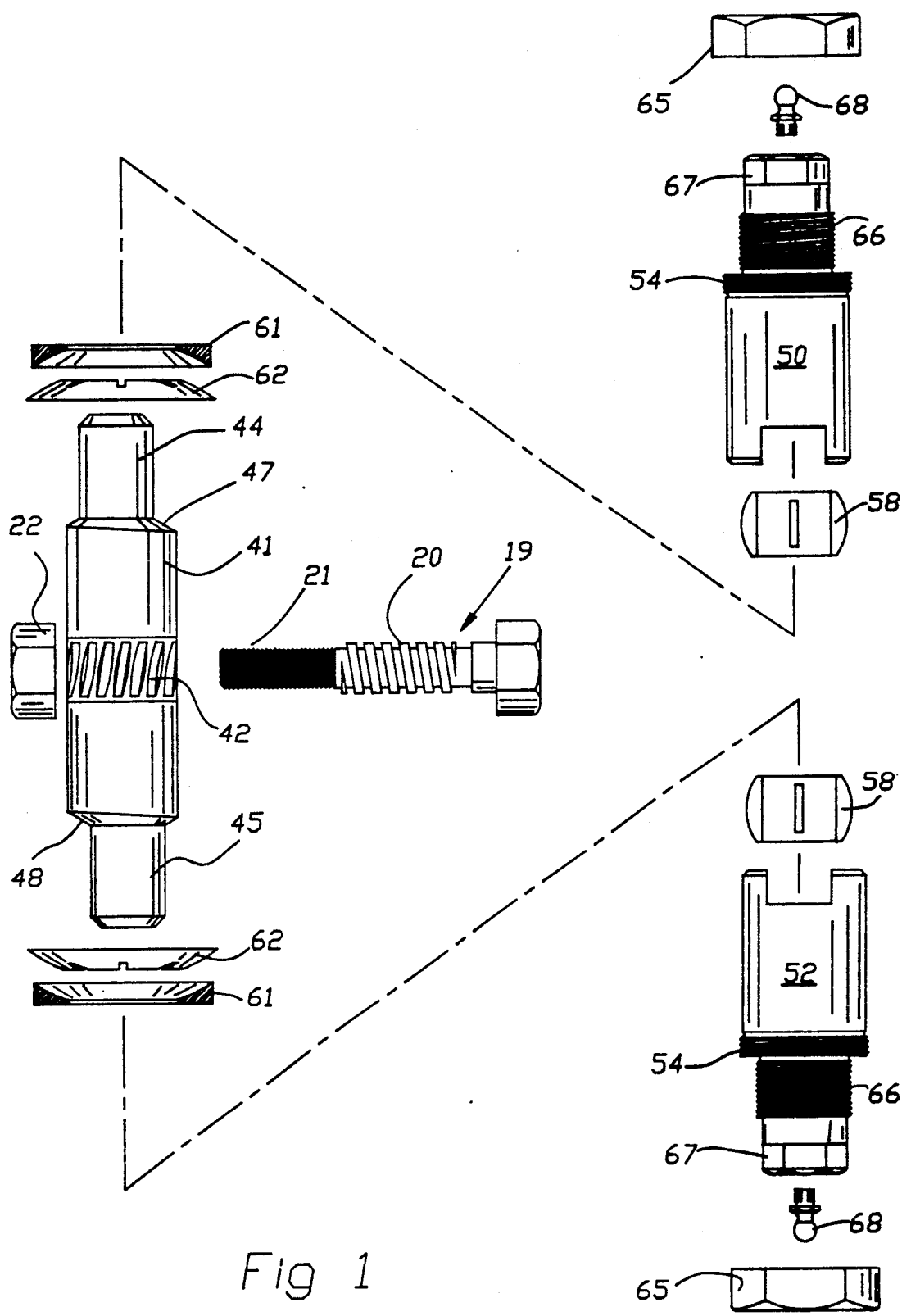
FIG. 1 is an exploded view of a partial kingpin assembly in accord with the instant invention and illustrating the relative positions of the components thereof.
Figure 2:
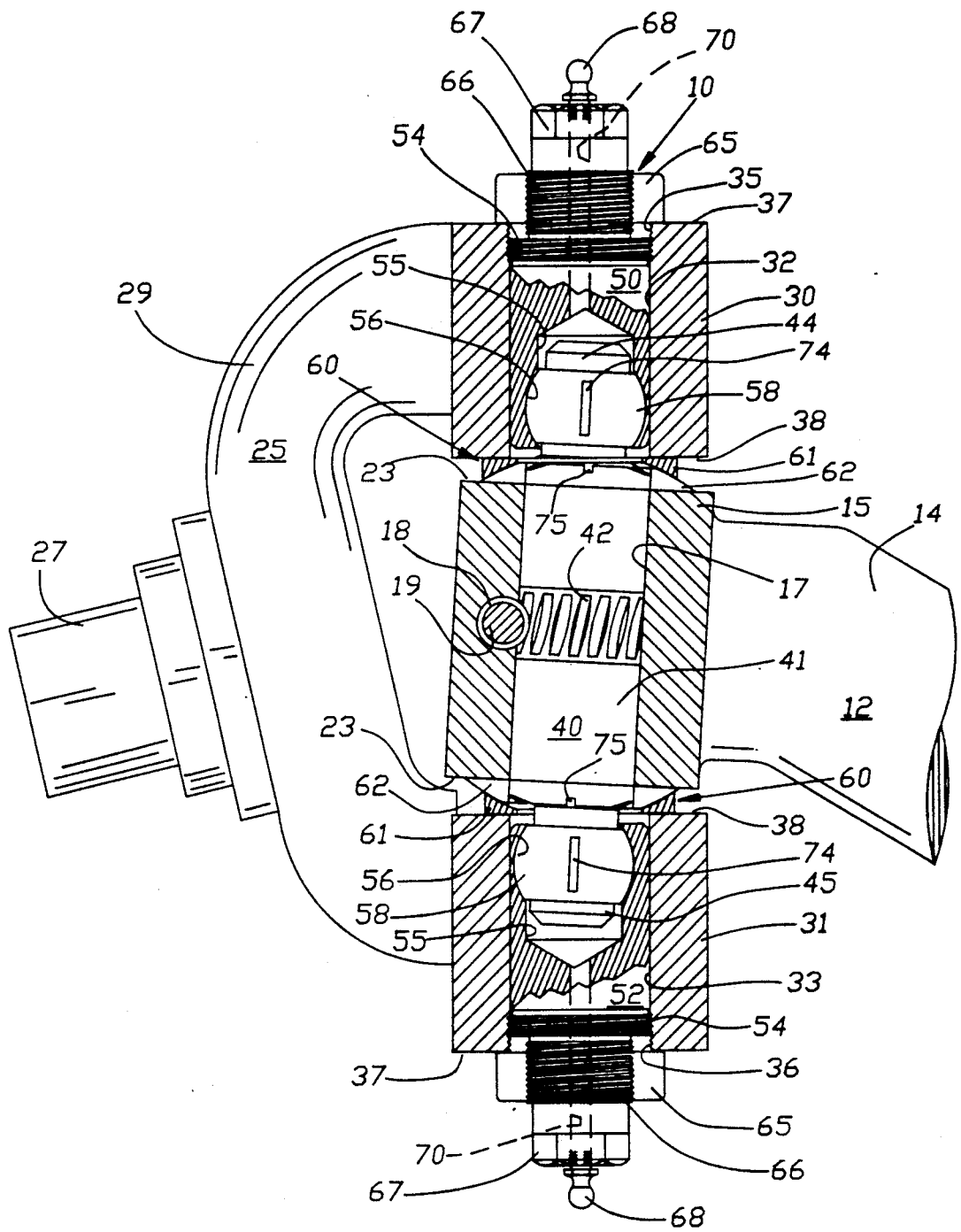
FIG. 2 is a cutaway view of the complete kingpin assembly of FIG. 1.
Figure 3:
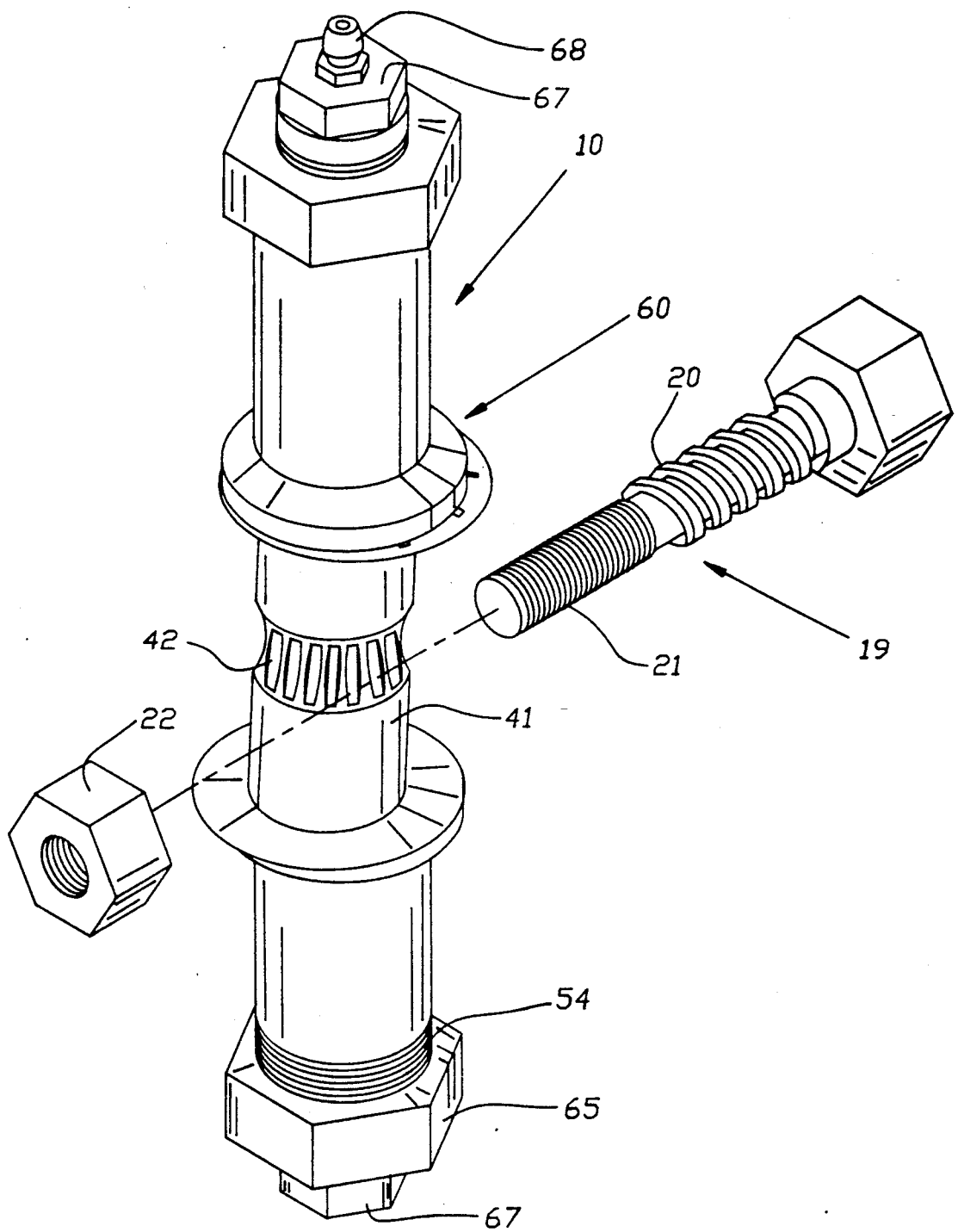
FIG. 3 is a perspective view of a kingbolt and angular compliance bearing means in accord with a preferred embodiment of the instant invention.
Figure 4:
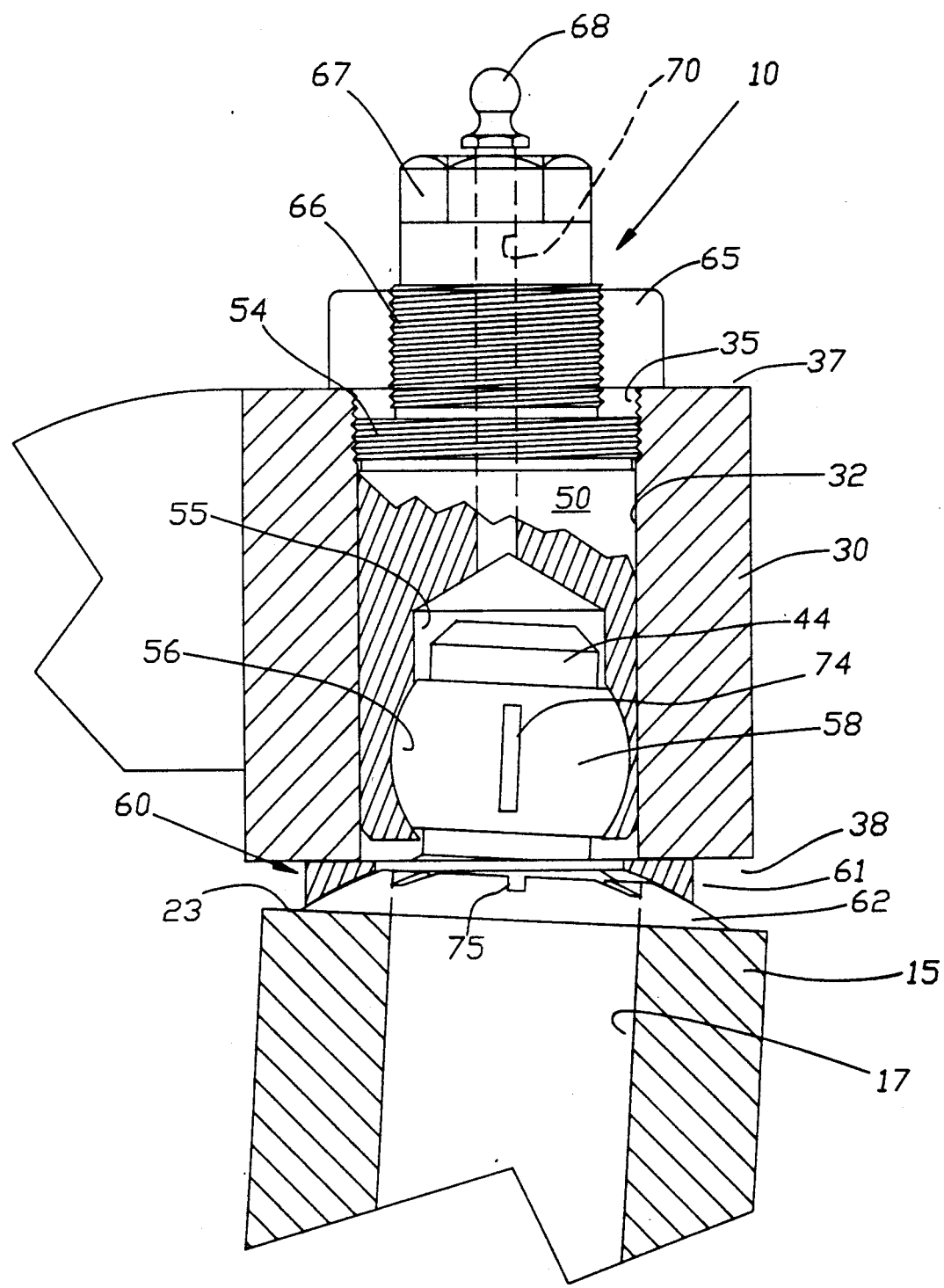
FIG. 4 is a cutaway view of an endcap in accord with a preferred embodiment of the instant invention.

Turning now to the drawings, in which similar components are designated by like reference numerals throughout the various figures, a preferred kingpin assembly in accord with the instant invention is shown in FIGS. 1 and 2 and generally designated by reference numeral 10 in FIG. 2. Kingpin assembly 10 includes axle assembly 12 which in turn includes solid axle 14 which terminates in steering knuckle 15. Knuckle bore 17 is defined through steering knuckle 15. Boss 18 supports screw 19 such that screw 19 extends tangentially across bore 17. Screw 19 has worm threads 20 defined at the mid portion and bolt threads 21 defined at the end portion. Nut 22 is sized to engage bolt threads 21. End surfaces 23 of knuckle 15 are smooth finishes and perpendicular to bore 17.

Kingpin assembly 10 also includes spindle assembly 25 on which spindle 27 is carried. The vehicle wheel (not shown) is mounted on spindle 27. Spindle assembly 25 also includes yoke member 29 and aligned upper and lower yoke cylindrical members 30 and 31, respectively, which in turn define upper and lower inner bores 32 and 33, respectively. Upper inner threads 35 are defined in upper inner bore 32 and lower inner threads 36 are defined in lower inner bore 33. Outer yoke end surfaces 37 at the outer ends of upper and lower cylindrical members 30 and 31 are substantially perpendicular to inner bores 32 and 33 as are inner end yoke surfaces 38 at inner, opposed ends of upper and lower yoke cylindrical members 30 and 31.

Axle assembly 12 and spindle assembly 25 are rotatably secured one to the other by kingbolt 40 having a main body portion 41 thereof which extends through knuckle bore 17 and upper and lower yoke cylindrical members 30 and 31 into inner bores 32 and 33. Female worm threads 42 are defined circumferentially around kingbolt main body portion 41 and engage worm threads 20 on screw 19 to both axially and rotatably locate kingbolt 40 in knuckle bore 17 as well as to provide for a means to rotate kingbolt 40 therein. Oppositely offset upper and lower projections 44 and 45 are defined on the end portions of kingbolt main body portion 41. Tapered upper and lower shoulders 47 and 48 serve to strengthen the transition from main body 41 to projections 44 and 45. While projections 44 and 45 extend into upper and lower yoke inner bores 32 and 33 the dimensions of projections 44 and 45 are appreciably smaller than bores 32 and 33.

Interposed between yoke inner bores 32 and 33 and projections 44 and 45 are upper and lower endcaps 50 and 52. With the exception of location, endcaps 50 and 52 are preferably identical, each having large diameter threads 54 adapted to engage upper and lower inner threads 35 and 36 defined in yoke inner bores 32 and 33. Both upper and lower endcaps 50 and 52 have an endcap offset opening 55 defined therein, a portion of which further defines a concave spherical surface 56. Three axis rotation means in the form of spherical bearing 58 is interposed between each of kingbolt upper and lower projections 44 and 45 and upper and lower endcaps 50 and 52. Thus, as kingbolt 40 is rotated in knuckle 15, upper and lower yoke cylindrical members 30 and 31 nutate relative to knuckle 15 This nutation resolves into orthogonal changes in camber and caster relative to spindle 27. Since the actual axis of rotation of spindle assembly 25 changes as kingbolt projections 44 and 45 are relocated, the changes are primary in the illustrated embodiment.

To accommodate the nutational movement and to carry the thrust between knuckle 15 and spindle assembly 25, spherical thrust bearings 60, which serve as three axis rotation means, are positioned between knuckle 15 and the inner end surfaces 38 of upper and lower yoke cylindrical members 30 and 31. As shown, thrust bearings 60 comprise complimentary concave member 61 and convex member 62. If required, conventional preload shims (not shown) may be positioned between bearing 60 and surface 23.

Upper and lower endcaps 50 and 52 are rotatable within upper and lower bores 32 and 33 respectively at the interface of upper and lower inner threads 35 and 36 and threads 54 defined on upper and lower endcaps 50 and 52. Nut 65 positioned on threads 66 defined on each of endcaps 50 and 52 serve to lock endcaps 50 and 5 to prevent such rotation. Hexagonal surfaces 67 are defined on the termini of endcaps 50 and 52 to facilitate rotation.

Grease fittings 68 which communicate with channels 70 defined in each of endcaps 50 and 52 allow for lubrication of bearings 56, 58 and 60 through grooves at the inner part of bearings 58 (not shown). Grooves 74 and 75 defined therein are provided as lubricant reservoirs.

The process of aligning a vehicle by means of kingpin assembly 10 involves a conventional determination of actual initial alignment and the required corrections to obtain the desired alignment. Then the primary corrections are first made. In the illustrated embodiment, kingbolt 40 is rotated by means of screw 19 to correct caster. However, since the eccentricity of kingbolt 40 is fixed, when the correct caster is obtained by the portion of eccentricity resolved in the fore-aft direction, the "unused" eccentricity will be resolved parallel to axle 14, either inboard or outboard of the initial setting. This latter change will affect the camber and steering angle and should be selected to effect the most beneficial change. Then, to the extent that the camber requires further correction, endcaps 50 and/or 52 are rotated, preferably equally, to bring the camber setting to the desired value. In the illustrated embodiment such final camber adjustment will not change the prior caster setting.

Certain assumptions have been made in selecting a preferred embodiment. For instance, spherical bearings 58 and thrust spherical bearings 60 are shown as solid bearings as is usually appropriate for high load, minimal movement applications. However, numerous other bearing types such as roller or ball bearings could be used should a particular application so require. Also, projections 44 and 45 are shown as being defined on kingbolt 40 and extending into endcaps 50 and 52. This structure provides the optimum of adjustment available with given dimensions of kingpin assembly 10. Alternatively, the bearing opening can be defined in the kingbolt and the projections on the endcaps.

While only limited configurations of specific embodiments of the present invention have been shown for purposes of illustration, it is expected that those skilled in the art will recognize a number of equivalent iterations of the invention and that the scope of the invention is to be determined only by the limits of the following claims.

What is claimed is:

1. In a solid axle steering assembly comprising:
   an axle;
   a spindle;
   a steering knuckle member having a cylindrical bore defined therethrough and end surfaces defined thereon;
   a yoke member having upper and lower bore housings each with bores defined therethrough each with an axis and positioned with each of the bore housings adjacent an end surface of the steering knuckle member, the yoke member and steering knuckle member being interposed between and fixed one each to the axle and spindle;
   the improvement comprising:
   a kingbolt having an axis and rotatably mounted within the steering knuckle bore, the kingbolt also having end portions;
   means to selectively rotate and lock the kingbolt within the steering knuckle member;
   endcaps mounted one each within each of the upper and lower bore housings, the endcaps and kingbolt being journalled together eccentrically relative to at least one of the kingbolt axis and a bore housing axis;

angular compliance bearing means interposed between the end portions of the kingbolt and adjacent endcap for permitting three axis movement therebetween; and compliant thrust bearing means positioned between the steering knuckle member end surfaces and the yoke bore housings for permitting three axis movement therebetween;

whereby at least one of caster and camber can be changed by rotating at least one of the kingbolt and endcaps.

2. The improvement as set forth in claim 1 in which the eccentric journal comprises offset projections relative to the kingbolt axis defined on the end portions of the kingbolt and each endcap has an opening defined therein into which a projection extends.

3. The improvement as set forth in claim 1 in which the eccentric journal comprises openings offset relative to the bore housing bores defined in each endcap and the kingbolt includes projections defined at the end portions thereof which extend into the openings.

4. The improvement as set forth in claim 1 in which the angular compliance bearing means comprise spherical bearings.

5. The improvement as set forth in claim 1 in which the compliant thrust bearing means comprise spherical bearings.

6. A method for adjusting alignment in a solid axle steering assembly including an axle, a spindle, a steering knuckle member having a bore with an axis defined therethrough, a yoke member movably attached to the steering knuckle and having upper and lower bore housings each with bores defined therethrough, the yoke member and steering knuckle member being interposed between and fixed one each to one of the axle and spindle, endcaps mounted in each of the bore housing bores, a kingbolt having an axis and end portions and mounted in the steering knuckle member bore and journalled at the end portions to the endcaps on an axis offset relative to at least one of the steering knuckle bore axis and the kingbolt axis, angular compliance bearing means interposed between the kingbolt and endcaps permitting three axis movement therebetween, and compliant thrust bearing means positioned between the steering knuckle member and the yoke bore housings permitting three axis movement therebetween, the method comprising the steps of:

rotating at least one of the kingbolt and an endcap to reposition the offset axis at the journal between the kingbolt and endcap;

repositioning the spindle relative to the axle by relative angular movement between the steering knuckle member and yoke member to accommodate the repositioned offset axis; and maintaining contact of the kingbolt and endcaps with the angular compliance bearing means and the steering knuckle member and yoke bore housings with the compliant thrust bearing means after said angular movement.

7. The method as set forth in claim 6 in which journals positioned between the kingbolt and endcaps are offset relative to the kingbolt axis and in which the kingbolt is rotated to move the yoke member relative to the steering knuckle member.

8. The method as set forth in claim 6 in which journals positioned between the kingbolt and endcaps are offset relative to the yoke bore housings bore axis and in which at least one endcap is rotated in the bore housing bore to move the steering knuckle member relative to yoke member.

9. The improvement as set forth in claim 1 in which the endcaps are rotatably mounted.

* * * * *